United States Patent [19]

Nagata

[11] Patent Number: 5,117,487
[45] Date of Patent: May 26, 1992

[54] METHOD FOR ACCESSING MICROPROCESSOR AND MICROINSTRUCTION CONTROL TYPE MICROPROCESSOR INCLUDING POINTER REGISTER

[75] Inventor: Miyuki Nagata, Yokohama, Japan

[73] Assignee: Kabushiki Kaisha Toshiba, Kawasaki, Japan

[21] Appl. No.: 398,437

[22] Filed: Aug. 25, 1989

[30] Foreign Application Priority Data

Aug. 26, 1988 [JP] Japan .................... 63-210673

[51] Int. Cl.$^5$ ............................. G06F 9/26
[52] U.S. Cl. .................. 395/375; 364/946.6;
364/925.6; 364/933.2; 364/933.7; 364/DIG. 1;
364/DIG. 2; 395/800
[58] Field of Search ... 364/200 MS File, 900 MS File

[56] References Cited

U.S. PATENT DOCUMENTS

| 4,124,890 | 11/1978 | Vasenkov et al. | 364/200 |
| 4,409,654 | 10/1983 | Wada et al. | 364/200 |
| 4,434,461 | 2/1984 | Puhl | 364/200 |
| 4,586,130 | 4/1986 | Butts, Jr. et al. | 364/200 |
| 4,878,174 | 10/1989 | Watkins et al. | 364/200 |

Primary Examiner—Thomas C. Lee
Assistant Examiner—William M. Treat
Attorney, Agent, or Firm—Foley & Lardner

[57] ABSTRACT

In a microprocessor, a microinstruction is used to control the microprocessor. The microprocessor includes: a decoder for decoding the STC instruction to obtain a decoded instruction and address data, the address data designating an address of a control space allocated to a plurality of registers in a general-purpose register group; an address register for temporarily storing the address data derived from the decoder; a microinstruction storage unit for previously storing a plurality of microinstructions and for outputting the microinstruction one by one in response to the decoded instruction; a microinstruction register for producing a control signal in response to the read microinstruction; a calculation unit for calculating the address data sotred in the address register means to obtain bit information of the address data for designating a specific register in response to the bit information derived from the calculation unit, while the general-purpose register group; and, a pointer register for temporarily storing the bit information to access the specific register in response to the bit information derived from the calculation unit, while the general-purpose register group is instructed in response to the control signal.

10 Claims, 7 Drawing Sheets

| ADDRESSES | CONTROL SPACES |
|---|---|
| H' 80000000 | |
| | CONTEXT EXTENDABLE |
| H' ffff8000 | |
| | CONTEXT ESCAPE |
| H' 00000000 | |
| | CPU : CONTROL REGISTER GROUP |
| H' 00000180 | |
| | CPU : GENERAL-PURPOSE REGISTER GROUP |
| H' 00000400 | |
| | CPU : |
| H' 00000800 | |
| | FPU : CONTROL REGISTER GROUP |
| | FPU : GENERAL-PURPOSE REGISTER GROUP |
| H' 00000c00 | |
| | FPU : |
| H' 00001000 | |
| | CD-PROCESSOR |
| H' 00008000 | |
| | EXTENDABLE |
| H' 40000000 | |
| | CHIP BUS CONTROL |
| H' 7fffffff | |

PRIOR ART
FIG.2B

ADDRESSES — GENERAL-PURPOSE REGISTER GROUP / REGISTERS

| ADDRESSES | REGISTERS |
|---|---|
| H' 0180 | - |
| H' 0184 | R0 |
| H' 0188 | - |
| H' 018C | R1 |
| H' 0190 | - |
| H' 0194 | R2 |
| H' 0198 | - |
| H' 019C | R3 |
| H' 01A0 | - |
| H' 01A4 | R4 |
| H' 01A8 | - |
| H' 01AC | R5 |
| H' 01B0 | - |
| H' 01B4 | R6 |
| H' 01B8 | - |
| H' 01BC | R7 |
| H' 01C0 | - |
| H' 01C4 | R8 |
| H' 01C8 | - |
| H' 01CC | R9 |
| H' 01D0 | - |
| H' 01D4 | R10 |
| H' 01D8 | - |
| H' 01Dc | R11 |
| H' 01E0 | - |
| H' 01E4 | R12 |
| H' 01E8 | - |
| H' 01EC | R13 |
| H' 01F0 | - |
| H' 01F4 | R14 |
| H' 01F8 | - |
| H' 01FC | PC |

................ RESERVED

METHOD FOR ACCESSING MICROPROCESSOR AND MICROINSTRUCTION CONTROL TYPE MICROPROCESSOR INCLUDING POINTER REGISTER

BACKGROUND OF THE INVENTION

1. Field of the Invention

The present invention generally relates to an accessing method and a microinstruction control type microprocessor. More specifically, the invention is directed to a microprocessor employing a so-called "pointer register" accessible to a desired register in register groups without receiving a direct instruction by microinstructions, and also to an accessing method thereof.

2. Description of the Related Art

In general, a control space for defining relationships between predetermined addresses and registers in various registers such as control registers and general-purpose registers is constituted by allocating the specific addresses to each register of these registers, and a specific, or desirable register is accessed based upon a decoded microinstruction in order that information is either stored into, or read out from a desired register which is has named by the specific address in a conventional microprocessor.

Very recently, a so-called "TRON (The Real-Time Operating System Nucleus)" computer operating system has been proposed. In connection with this "TRON" operating system, various types of microprocessors have been developed. These "TRON" operating system and relevant microprocessors are described in, for instance, "TRON Project 1987" Open-Architecture Computer System, by K. Sakamura, issued from Springer-Verlay publisher Tokyo 1987, on pages 291 to 308.

Figure 1:
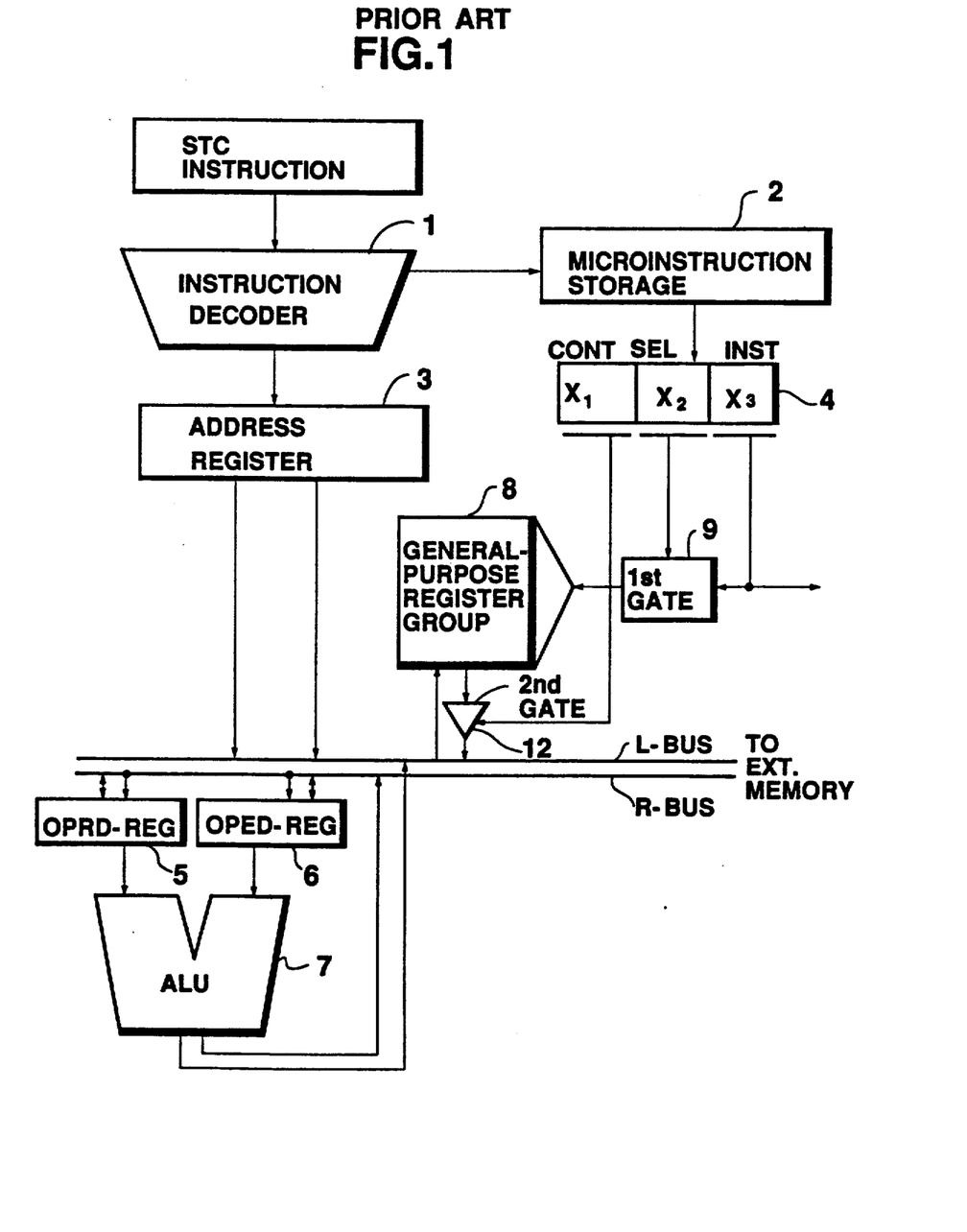
FIG. 1 is a schematic block diagram of a conventional microprocessor.
Figure 2A:
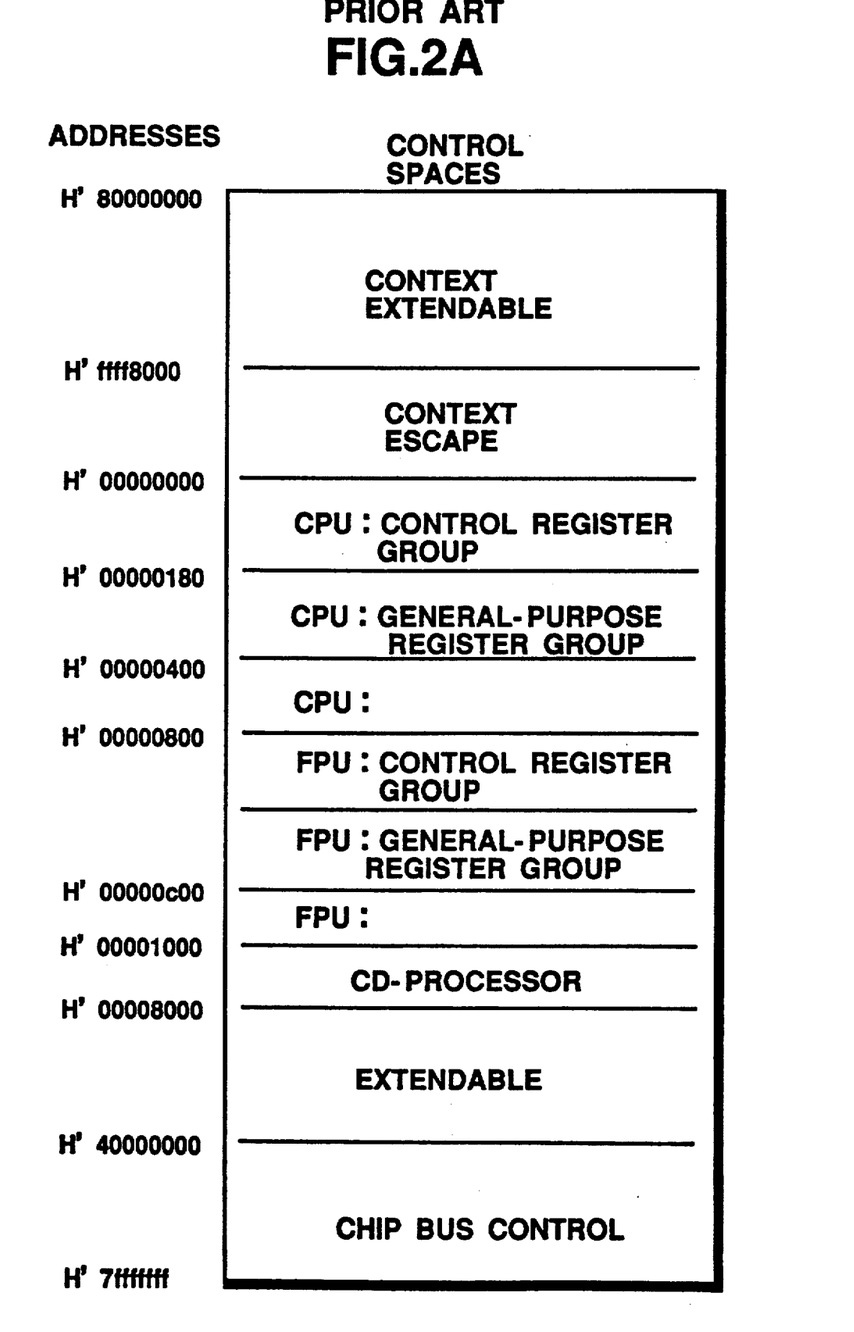
FIGS. 2A and 2B illustrate address maps on control spaces for the microprocessor shown in FIG. 1.
Figure 2B:
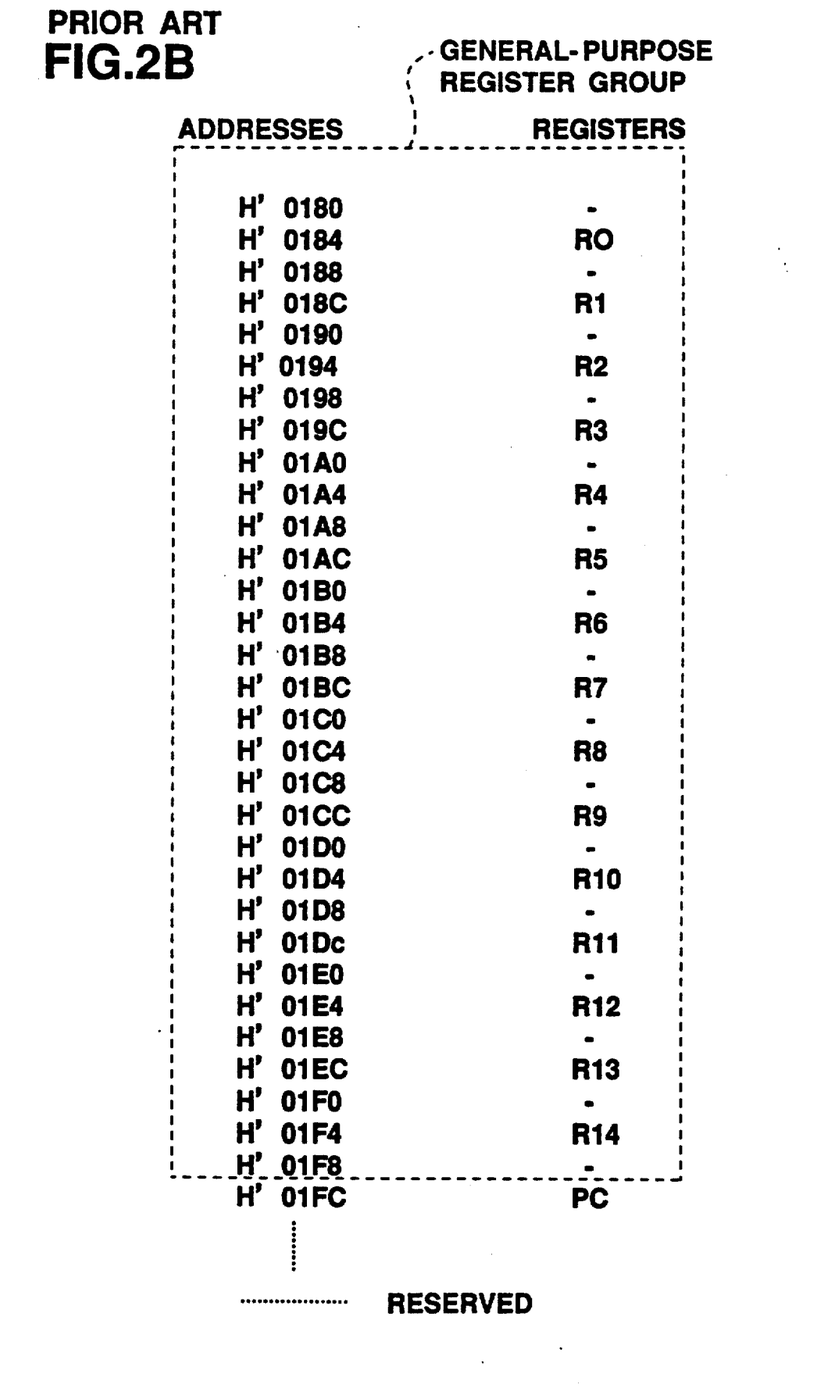

In FIG. 1, there is shown an internal arrangement of one conventional microprocessor applicable to the above-described "TRON" operating system. FIG. 2A represents an overall address map on typical addresses and respective register groups, which constitute a control space that has been introduced in the "TRON" system, and FIG. 2B illustrates another map of addresses which are indicated by way of the hexadecimal notation and allocated to each register in the general-purpose register group. As is apparent from the address maps shown in FIGS. 2A and 2B, a large quantity of addresses for the control space are utilized in the "TRON" operating system.

A register accessing operation of the conventional microprocessor shown in FIG. 1 will now be described. That is, when data is stored or read from a specific register in a general-purpose register group 8 which has been designated by a STC (store-control-space) instruction, a sequential comparison is made between an address instructed by an address register 3 and 15 pieces of addresses of the control space, e.g., H'0184 and H'018C which have been allocated to the respective registers in the general-purpose register group 8. Then, when a coincidence occurs in the address comparison operations, the instructed or desired register, for instance, R0 or R1 is accessed for the data storage and/or read purposes which will be discussed later in detail. In the microprocessor illustrated in FIG. 1, two operand registers 5 and 6 for temporarily storing operands are connected to data buses "L-BUS" and "R-BUS". An arithmetic and logic unit (simply referred to as an "ALU") 7 is connected to these operand registers 5 and 6 and to the data buses "L-BUS" and "R-BUS". A first gate 9 is connected to control registers 4 and also to the general-purpose register group 8. A second gate 12 is interposed between the general-purpose register group 8 and the data bus "L-BUS".

Referring now to a flowchart shown in FIG. 3, an accessing operation to a desired register "R0" to "R14" among the general-purpose register group 8 for constituting a control space, will now be described in detail.

When, for instance, contents (data) of a specific register "R0" to "R14" in the general-purpose register group 8 are wanted to be read, the STC instruction is decoded in the instruction decoder 1 so as to obtain a decoded instruction and address data. Then, the microinstruction previously stored in the microinstruction storage unit (ROM) 2 is read in response to the decoded instruction and the read microinstruction is stored in the microinstruction register 4 (see FIG. 1). Thereafter, the general-purpose register group 8 is designated by the selection field "$X_2$" of the microinstruction. Furthermore, a specific register, e.g., register R4 shown in FIG. 2B in the register group 8, is designated by the register number instruction field "$X_3$", and thus the operation instructed by the control field "$X_1$" is performed. That is, the data is read out from the register R4 in the general-purpose register group 8 and transferred via the data bus "L-BUS" to an external memory (not shown in FIG. 1).

Figure 3:
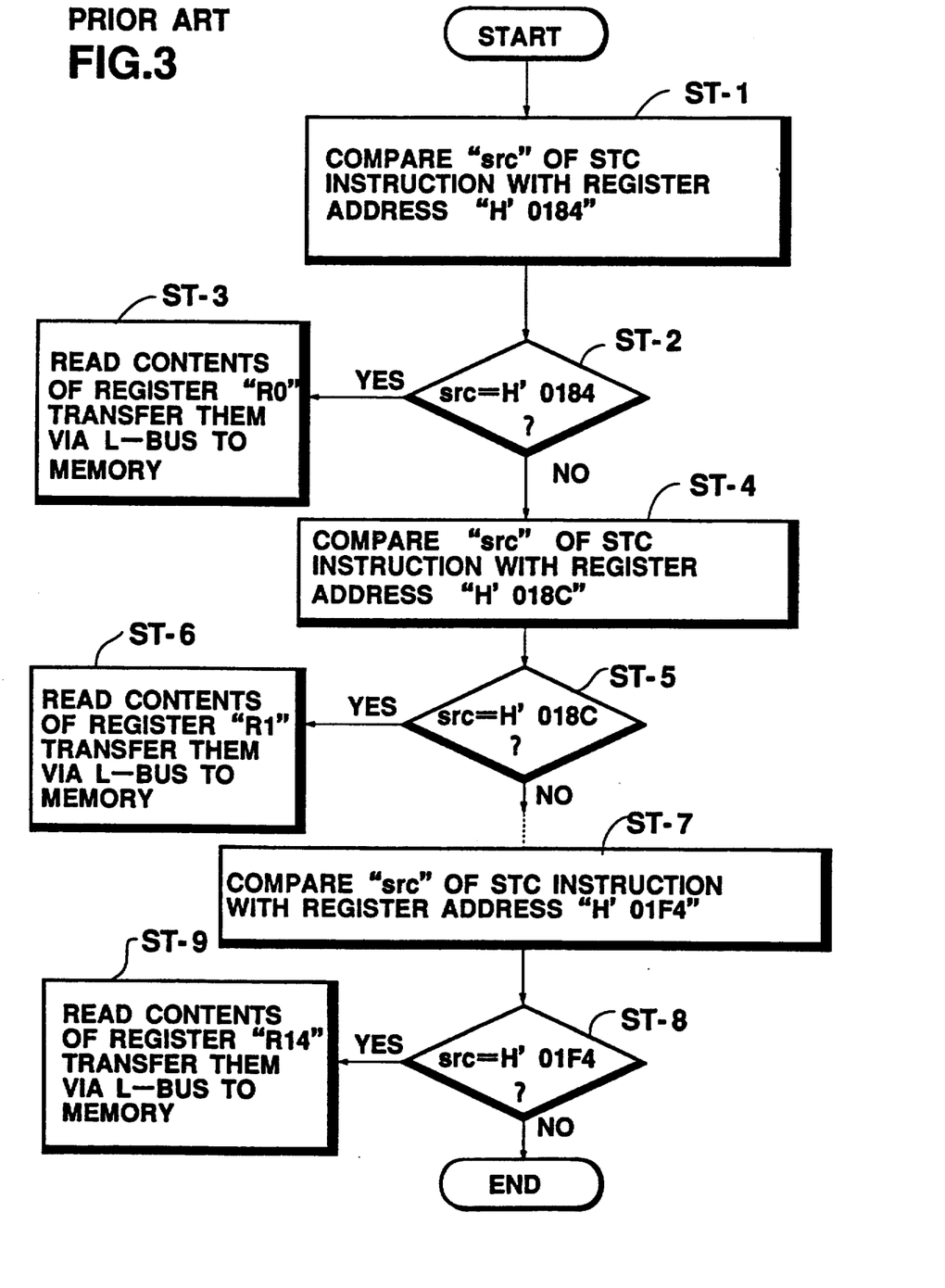
FIG. 3 is a flowchart for explaining a register addressing operation performed in the conventional microprocessor represented in FIG. 1.

In the flowchart shown in FIG. 3, in a first step ST-1, an address "src" of a source operand of the above-described STC instruction is compared with another address "H'0184" allocated to the first register "R0", indicated in the hexadecimal notation, in the general-purpose register group 8 shown in FIG. 2B. If the first address "src" is coincident (with the second address "H'0184 (in a step ST-2), the contents (data) of the first register "R0" are read out and transferred via the data bus "L-BUS" to the external memory (not shown in detail) in the subsequent step ST-3. To the contrary, if a comparison result is NO in the previous step ST-2, the addressing process is advanced to a next step ST-4. In this step ST-4, a similar comparison is made between the address "src" and a new address "H'018C" of the second register R1. If this "src" is equal to the new address "H'018C" (step ST-5), the content of the second register R1 is read and thereafter transferred via the data bus L-BUS to the external memory. However, if the comparison result becomes NO, then an address "H'0194" of the subsequent register R2 is compared with the address "src" in the next step (not shown in detail). Subsequently, such a comparison operation is sequentially executed so as to retrieve a coincident address.

As a consequence, as is apparent from the above-described series of the address accessing operation, such an address accessing operation must be repeated 15 times until the desired specific register finally retrieved in case that the specific register corresponds to a fifteenth register R14. Therefore, the number of steps in the retrieving program is considerably increased.

Furthermore, there is another problem in that a large quantity of microprograms are necessarily required so as to fetch the contents of the register whose address coincides with the address "src" of the STC microinstruction.

SUMMARY OF THE INVENTION

The present invention has been made in an attempt to solve the above-described problems, and therefore has an object to provide a microinstruction control type microprocessor newly employing a so-called "pointer register" directly accessible to the desired register in the general-purpose register group. In the microprocessor according to the invention, the desired register in the general-purpose register group can be accessed without instructing the register group by the microinstruction in such a manner that the respective registers in the general-purpose register group can be directly accessed by the pointer register based upon the bit information calculated from the address of the control space address map which has been designated by the address of the STC instruction.

To achieve the above-described object, a microprocessor according to the present invention comprises:

decoder means (1) for decoding an STC instruction to obtain a decoded instruction and address data (H'0184: H'01F4), said address data designating an address of a control space allocated to a plurality of registers (R0: R14) in a general-purpose register group (8);

address register means (3) for temporarily storing the address data derived from the decoder means (1);

means (2) for previously storing a plurality of microinstructions and for outputting said microinstructions one by one in response to the decoded instruction;

means (4) for temporarily storing said output microinstruction and for producing a control signal;

calculation means (7) for calculating the address data stored in the address register means (3) to obtain bit information of the address data for designating a specific register (R0:R14) in response to the bit information derived from the calculation means (7), while instructing the general-purpose register group (8); and, pointer register means (10) for temporarily storing the bit information so as to access the specific register (R0:R14) in response to the bit information derived from the calculation means (7), while the general-purpose register group (8) is instructed in response to the control signal.

Furthermore, to accomplish the object, a method for accessing a microinstruction control type microprocessor, according to the invention, comprises the steps of:

decoding an STC instruction to obtain a decoded instruction and address data (H'0184:H'01F4), said address data designating an address of a control space allocated to a plurality of registers (R0:R14) in a general-purpose register group (8);

storing said address data;

reading a microinstruction in response to the decoded instruction from a microinstruction storage unit (2);

producing a control signal in response to the microinstruction from a microinstruction register (4);

calculating said address data so as to produce bit information of the address data for designating a specific register (R0:R14) in the general-purpose register group (8); and, accessing the specific register (R0:R14) in response to the bit information, while instructing the general-purpose register group (8) in response to the control signal.

BRIEF DESCRIPTION OF THE DRAWINGS

For a better understanding of the present invention, reference is made to the following descriptions in conjunction with the accompanying drawings, in which.

DETAILED DESCRIPTION OF THE PREFERRED EMBODIMENTS

ARRANGEMENT OF THE MICROPROCESSOR

Figure 4:
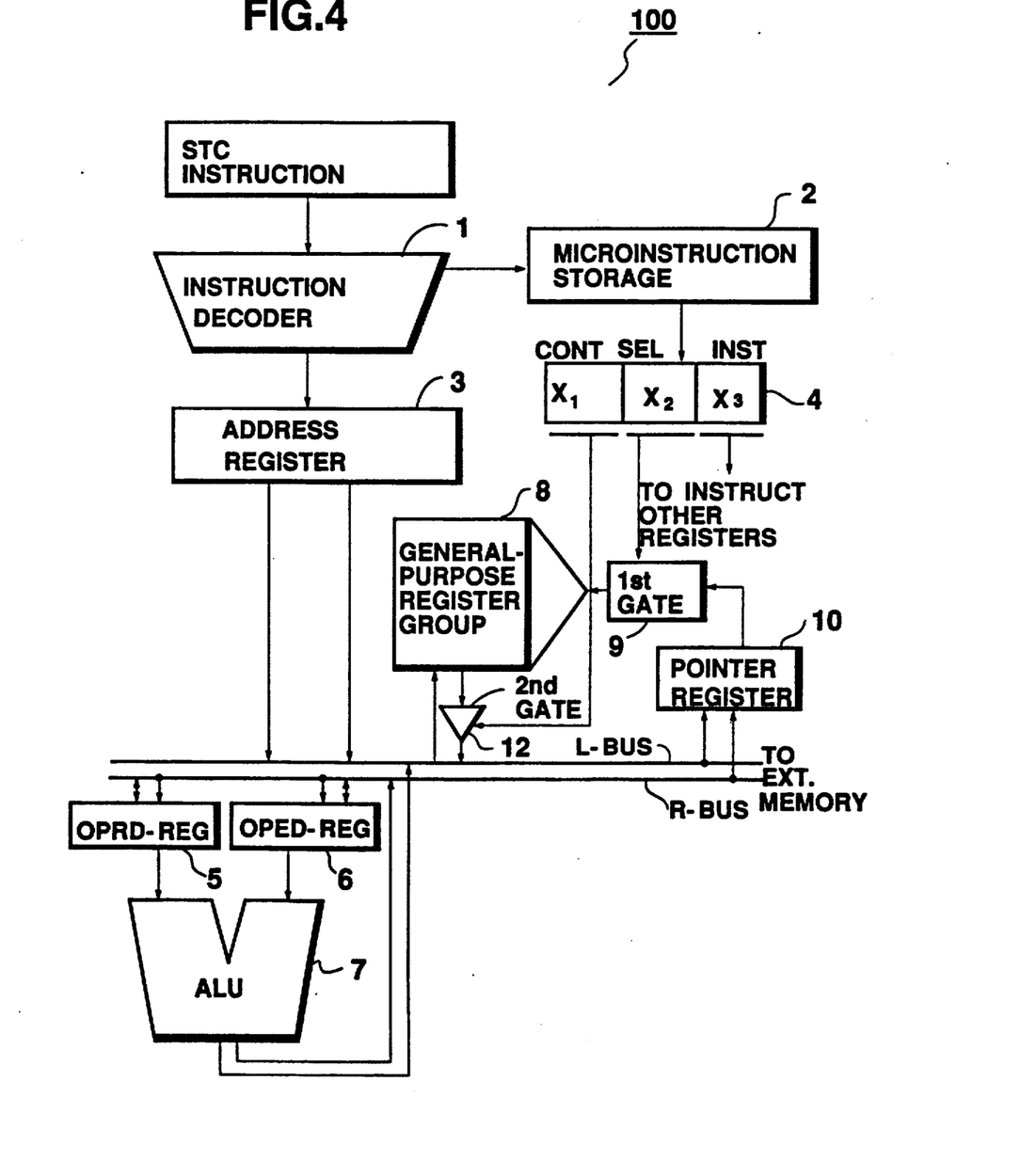
FIG. 4 is a schematic block diagram of a microprocessor 100 according to a first preferred embodiment of the invention.

Referring now to FIG. 4, a microinstruction control type microprocessor 100 according to a first preferred embodiment of the invention will be described.

It should be noted that the same reference numerals shown in FIG. 1 will be employed as those for denoting the same or similar circuit elements shown in FIG. 4.

In the microprocessor 100 illustrated in FIG. 4, an instruction decoder 1 is employed so as to decode the STC (store-control-space) instruction, thereby obtaining address data and a decoded instruction. A plurality of microinstructions are previously stored in a microinstruction storage unit (ROM) 2. The microinstruction is read out from this microinstruction storage unit 2 one by one in response to the decoded instruction sent from the instruction decoder 1. On the other hand, address data decoded from the instruction decoder 1 is temporarily stored in an address register 3. A microinstruction register 4 includes a control field "$X_1$", a selection field "$X_2$", and an instruction field "$X_3$". From these fields $X_1$, $X_2$, $X_3$, control signals are produced in response to the microinstruction read from the microinstruction storage unit 2. The output of the address register 3 is connected to data buses "L-BUS" and "R-BUS". Operand registers 5 and 6 for temporarily storing operands are also connected to the data buses "L-BUS" and "R-BUS". An arithmetic and logic unit (simply referred to as an "ALU") 7 is interposed between the outputs of the operand registers 5 and 6, and the data buses "L-BUS" and "R-BUS". A "pointer register" 10 which has been newly introduced in the present invention, is connected between the data buses "L-BUS" and "R-BUS", and the general-purpose register group 8 via a first gate 9. The first gate 9 receives a selection signal from the selection field "$X_2$" of the microinstruction register 4. The pointer register 10, as a major feature of the present invention, temporarily stores bit information which has been calculated in ALU 7 from the address data of the STC microinstruction. This address data is stored in the address register 3. The output of the general-purpose register group 8 is connected via a second gate 12 to the data bus "L-BUS". The content (data) of the specific register in the general-purpose register group 8, which has been accessed by the pointer register 10, is gated by this second gate 12 in response to the control signal derived from the control field "$X_1$" of the microinstruction register 4.

DEFINITION OF POINTER REGISTER

As previously described, the major feature of the present invention is to newly employ a so-called "pointer register" in the microinstruction control type microprocessor 100 as represented in FIG. 4. For a better understanding of this major feature, the function of this "pointer register" will now be defined as follows.

The bit information which is first calculated in ALU 7 from the address among the control space address map that has been designated by the address of the above-described STC (store-control-space) instruction. Then the calculated bit information is set in the pointer register 10 via the data buses "L-BUS" and "R-BUS". As a result, a specific, or desired register in the general-purpose register group 8 can be designated, or accessed by this pointer register 10. In other words, the specific register in the general-purpose register group 8 is no longer required to be designated by the instruction field "$X_3$" of the microinstruction register 4, but this specific register can be accessed by merely, commonly designating general-purpose register group 8 by way of the selection field "$X_2$" of the microinstruction register 4, based upon the bit information temporarily stored in the pointer register 10.

REGISTER ACCESSING BY POINTER REGISTER

Referring now to a flowchart shown in FIG. 5, operations of the microprocessor 100 shown in FIG. 4 will be described in detail.

The STC instruction which has been decoded by the instruction decoder 1 is supplied to the microinstruction storage unit 2 so as to read therefrom the microinstruction one by one, and, on the other hand, the address data decoded from the STC instruction is temporarily stored in the address register 3.

The microinstruction read out from the microinstruction storage unit 2 in response to the decoded instruction is transferred to the microinstruction register 4, whereby various control signals are produced from the control field "$X_1$" for designating the operation to be processed; the selection field "$X_2$" for designating the overall general-purpose register group 8; and the instruction field "$X_3$" for designating other registers in this microprocessor 100.

The contents, (i.e,. address data) of the address register 3 for instructing the address of the control space address map are shifted, for instance, by 3 bits from LSB (least significant bit) of the entire bit thereof in the right direction by ALU 7 in response to the microinstruction. Thereafter the bit-shifted address data (i.e., bit information) is sent via the data bus "L-BUS" to the pointer register 10. Thus, the accessing operation of the specific (designated) register in the general-purpose register group 8 is carried out for the operations instructed by the subsequent microinstruction given via the first gate 9 (step S-1).

Now, the bit-shift operation on the address "src" of the source operand of this STC microinstruction will be described in more detail.

Figure 6:
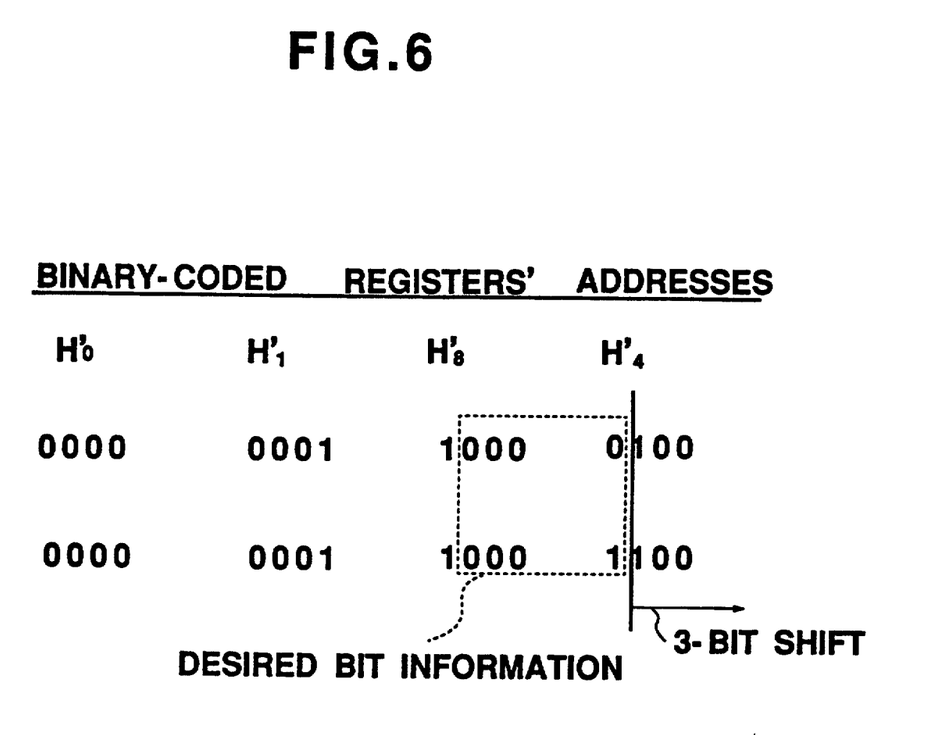

In FIG. 6, there are shown binary-coded addresses of two addresses selected from the register addresses H'0184 to H'01F4 which are represented by the hexadecimal notation. These binary-coded addresses are furnished from the address register 3 to ALU 7. The bit data of each address are shifted by only 3 bits from LSB (least significant bit) of the entire bit data in the right direction, and thereafter supplied to the pointer register 10 for storage purposes (step S-2). It should be noted that such bit-shift operation implies that since 3 bit data from the least significant bit (LSB) of the respective binary-coded address data are shifted, 3-bit address bit information is unused for the register accessing operation. In other words, these shifted 3-bit data are no longer required for accessing the desired register in the general-purpose register group 8. After all, 4 bits of information from a new least significant bit of the bit-shifted binary coded address information corresponds to "bit information" necessary for accessing the desired register in the general-purpose register group 8 (see FIG. 6). In accordance with the present invention, the desired register can be directly accessed by the pointer register 10 utilizing the above-described 4-bit information of the bit-shifted address data.

Thus, the contents of the desirable register accessed by the pointer register 10 are read out in response to the instruction from the control register "$X_1$", while opening the second gate 12, and thereafter transferred to the external memory (not shown) (step S-3).

Figure 5:
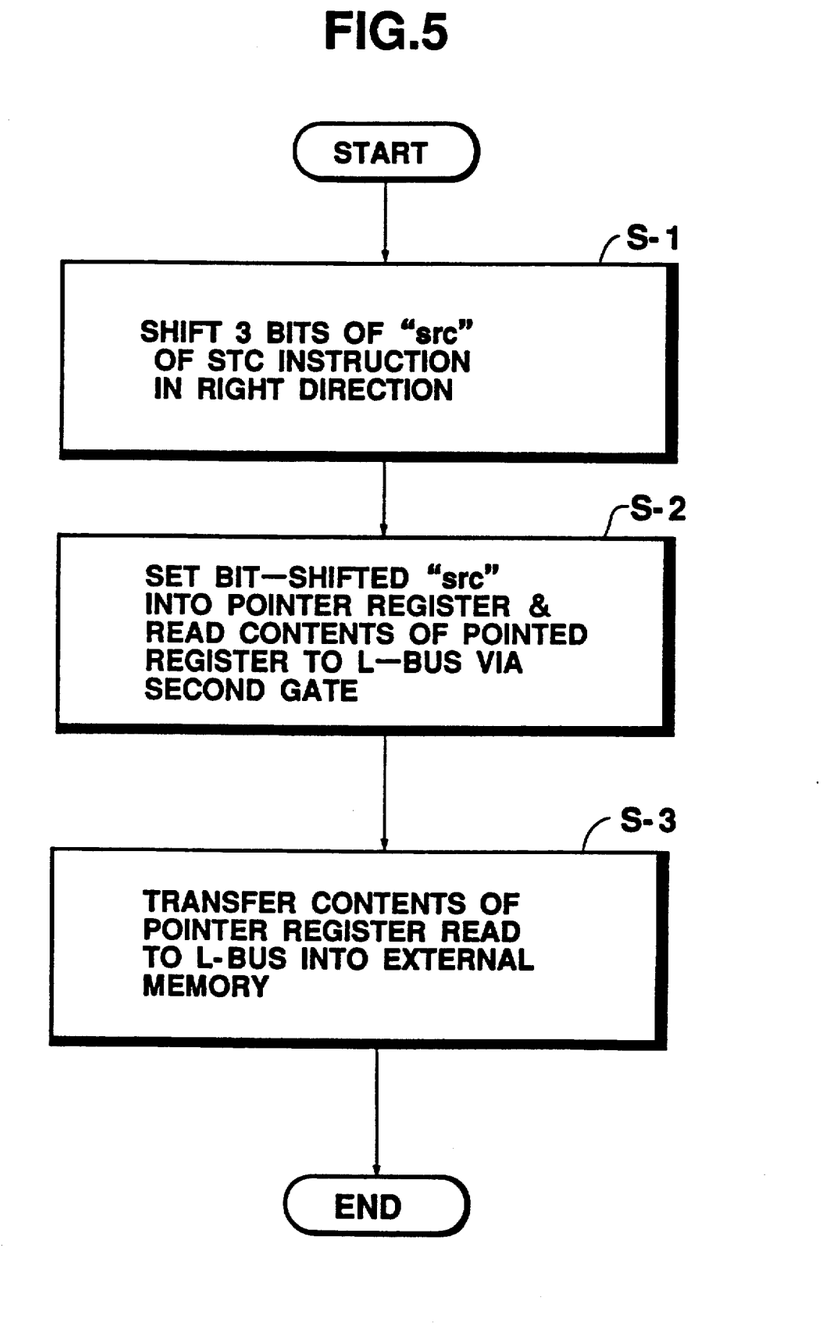
FIG. 5 is a flowchart for explaining a register addressing method of the microprocessor 100 shown in FIG. 4; and, FIG. 6 is an illustration for explaining the bit shift operation executed in the microprocessor shown in FIG. 4.

While has been described in detail, in the microprocessor 100 according to the preferred embodiment, the desired register belonging to the general-purpose register group 8 is accessible with considerably small accessing steps, as compared with the conventional register accessing method (compare the flowchart shown in FIG. 3 with that of FIG. 5).

There is therefore a particular advantage that the specific register in the general-purpose register group can be designated by the pointer register according to the present invention without designating this register based upon the STC instruction. As a consequence, a desired general-purpose address can be accessed without retrieving the address in the control space.

In addition, since each of the registers is designated by the bit information stored in the pointer register, the microinstruction is only used to instruct the overall general-purpose register group. As a result, the microprogram for designating the respective registers can be shortened and moreover an access time required for accessing the microinstruction storage unit can be reduced. Consequently, the entire number of steps of the microprogram may be considerably reduced and furthermore the microprogram processing speed may be increased.

In other words, the reduction of number of the microprogram steps also implies that the microinstruction storage unit can be effectively utilized.

What is claimed is:

1. A microinstruction control type microprocessor comprising:

decoder means for decoding an instruction to obtain a decoded instruction and address data; said address data designating an address of a control space allocated to a plurality of registers in a general-purpose register group;

address register means for temporarily storing the address data derived from the decoder means;

means for previously storing a plurality of microinstructions and for outputting said microinstructions one by one in response to the decoded instruction;

means for temporarily storing said output microinstruction and for producing a control signal;

calculation means for calculating the address data stored in the address register means to obtain bit information of the address data by shifting a preselected number of bits constituting said address data; and, pointer register means for temporarily storing the bit information derived from said calculation means, said bit information being used to access a specific register contained in said general-purpose register group, while the general-purpose register group is instructed in response to the control signal.

2. A microinstruction control type microprocessor as claimed in claim 1, wherein said microinstruction storing means includes a microinstruction storage unit, and a microinstruction register having a control field, a selection field, and an instruction field.

3. A microinstruction controlled type microprocessor as claimed in claim 1, further comprising:

a first gate interposed between the pointer register means and general-purpose register group, for gating a supply of the bit information of the address data from the pointer register means to the general-purpose register group in response to a selection signal from the selection field of the microinstruction register; and, a second gate connected to an output of the general-purpose register group, for gating a supply of a content of the register accessed by the pointer register means in response to a control signal of the control field of the microinstruction register.

4. A microinstruction control type microprocessor as claimed in claim 1, further comprising:

operand registers for storing operands contained in the address data supplied from the address register means.

5. A microinstruction control type microprocessor as claimed in claim 1, wherein said control space is used in a TRON (The Real-Time Operating System Nucleus) computer operating system.

6. A microinstruction control type microprocessor as claimed in claim 1, wherein said calculating means first shifts the address data by 3 bits from a least significant bit thereof, and secondly derives 4 bits of the bit-shifted address data from a new least significant bit of the bit-shifted address data, said 4 bits corresponding to the bit information of the address data for designating the specific register.

7. A method for accessing a microinstruction control type microprocessor, comprising the steps of:

decoding an instruction to obtain a decoded instruction and address data, said address data designating an address of a control space allocated to a plurality of registers in a general-purpose register group;

storing said address data in an address register;

reading a microinstruction in response to the decoded instruction from a microinstruction storage unit;

producing a control signal in response to the microinstruction from a microinstruction register;

calculating said address data so as to product bit information of the address data by shifting a preselected number of bits constituting said address data; and, accessing a specific register contained in said general-purpose register group based on said bit information of the address data, while instructing said general-purpose register group in response to said control signal.

8. A method for accessing a microinstruction control type microprocessor as claimed in claim 7, wherein said register accessing operation is carried out by a pointer register.

9. A method for accessing a microinstruction control type microprocessor as claimed in claim 7, wherein said address data is first shifted by 3 bits from a least significant bit thereof, and secondly 4 bits of the bit-shifted address data are derived, said 4 bits address data corresponding to the bit information of the address data for designating the specific register.

10. A method for accessing a microinstruction control type microprocessor as claimed in claim 7, wherein said register accessing operation is executed in a TRON computer operating system.

* * * * *